(12) United States Patent
Mueller et al.

(10) Patent No.: US 9,844,985 B2
(45) Date of Patent: Dec. 19, 2017

(54) TIRE MODULE WITH PIEZOELECTRIC TRANSDUCER

(71) Applicant: Huf Hülsbeck & Fürst GmbH & Co. KG, Velbert (DE)

(72) Inventors: Benjamin Mueller, Karlsuhe (DE); Ingemar Wolf, Moerlenbach (DE); Andre Seifert, Pforzheim (DE)

(73) Assignee: HUF HÜLSBECK & FÜRST GMBH & CO. KG, Velbert (DE)

( * ) Notice: Subject to any disclaimer, the term of this patent is extended or adjusted under 35 U.S.C. 154(b) by 351 days.

(21) Appl. No.: 14/619,337

(22) Filed: Feb. 11, 2015

(65) Prior Publication Data
US 2015/0151593 A1 Jun. 4, 2015

Related U.S. Application Data

(63) Continuation of application No. PCT/EP2013/067089, filed on Aug. 15, 2013.

(51) Int. Cl.
*B60C 23/04* (2006.01)

(52) U.S. Cl.
CPC ...... *B60C 23/0493* (2013.01); *B60C 23/0411* (2013.01); *B60C 23/0447* (2013.01)

(58) Field of Classification Search
CPC .......... B60C 23/0493; B60C 23/0411; B60C 23/0447
See application file for complete search history.

(56) References Cited

U.S. PATENT DOCUMENTS

2004/0118196 A1* 6/2004 Landes ............... G01K 1/024
73/146
2009/0115591 A1* 5/2009 Mancosu ............ B60C 23/0493
340/447

FOREIGN PATENT DOCUMENTS

DE 10 2008 041852 A1 3/2010
DE 10 2010 038136 A1 4/2012

* cited by examiner

*Primary Examiner* — Paul West
(74) *Attorney, Agent, or Firm* — Hackler Daghighian Martino & Novak

(57) ABSTRACT

A tire module and cover for attachment to a pneumatic tire for vehicles is disclosed. The tire module has a device for measuring and/or monitoring the air pressure in the tire, a transmitter, a mechanical-electrical transducer, and an accumulator for electrical energy storage. The cover includes a flange which extends outwardly away from the tire module and has an underside for attachment to the inner side of the tire, said flange forming the edge of the interior space of the cover. The inner height of the cover may be less than or equal to the height of the tire module measured from the underside to the top side thereof. The flange has an inwardly directed projection which engages beneath the tire module. The underside of the tire module is higher up in the region of the flange projection as compared to a central underside region.

20 Claims, 3 Drawing Sheets

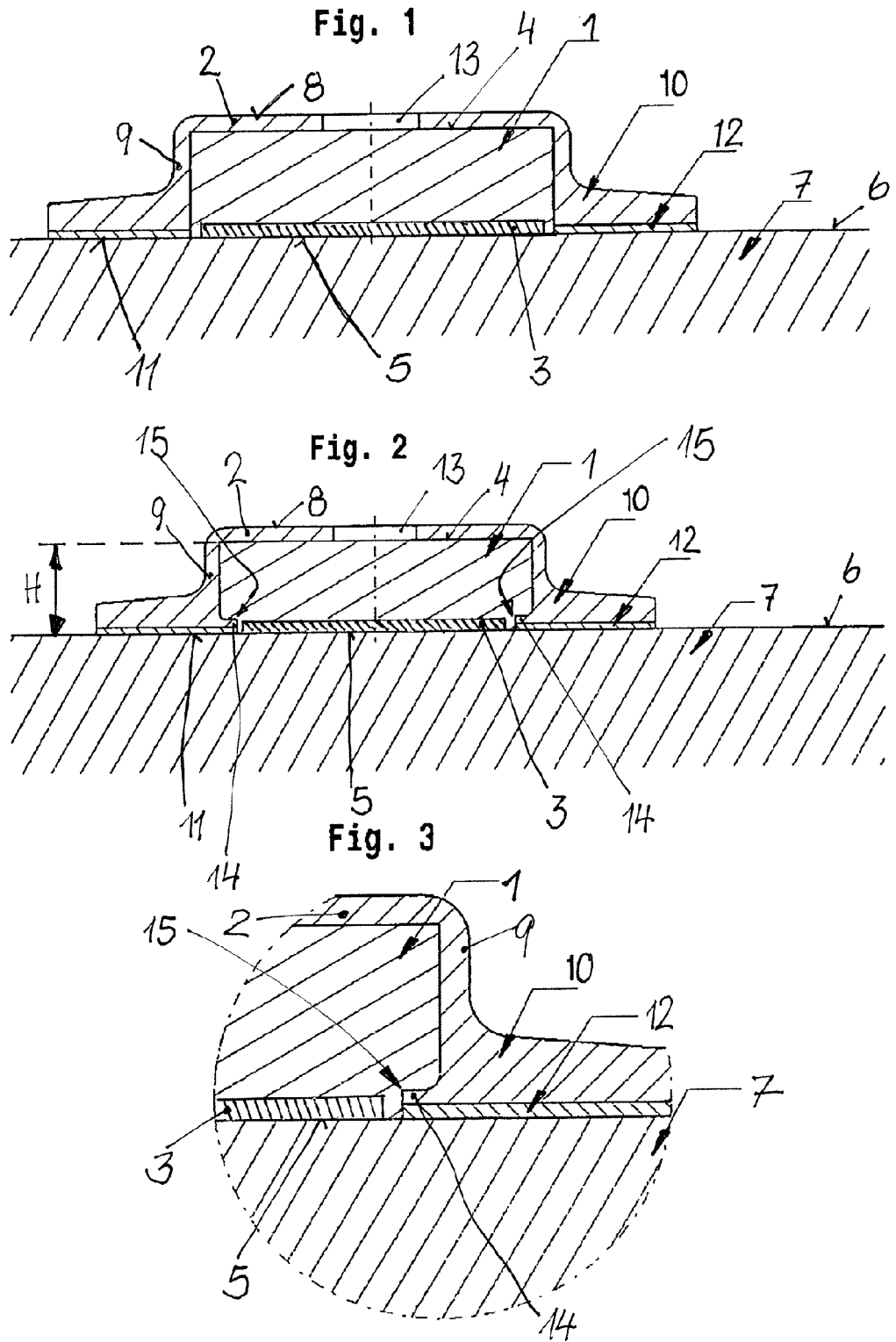

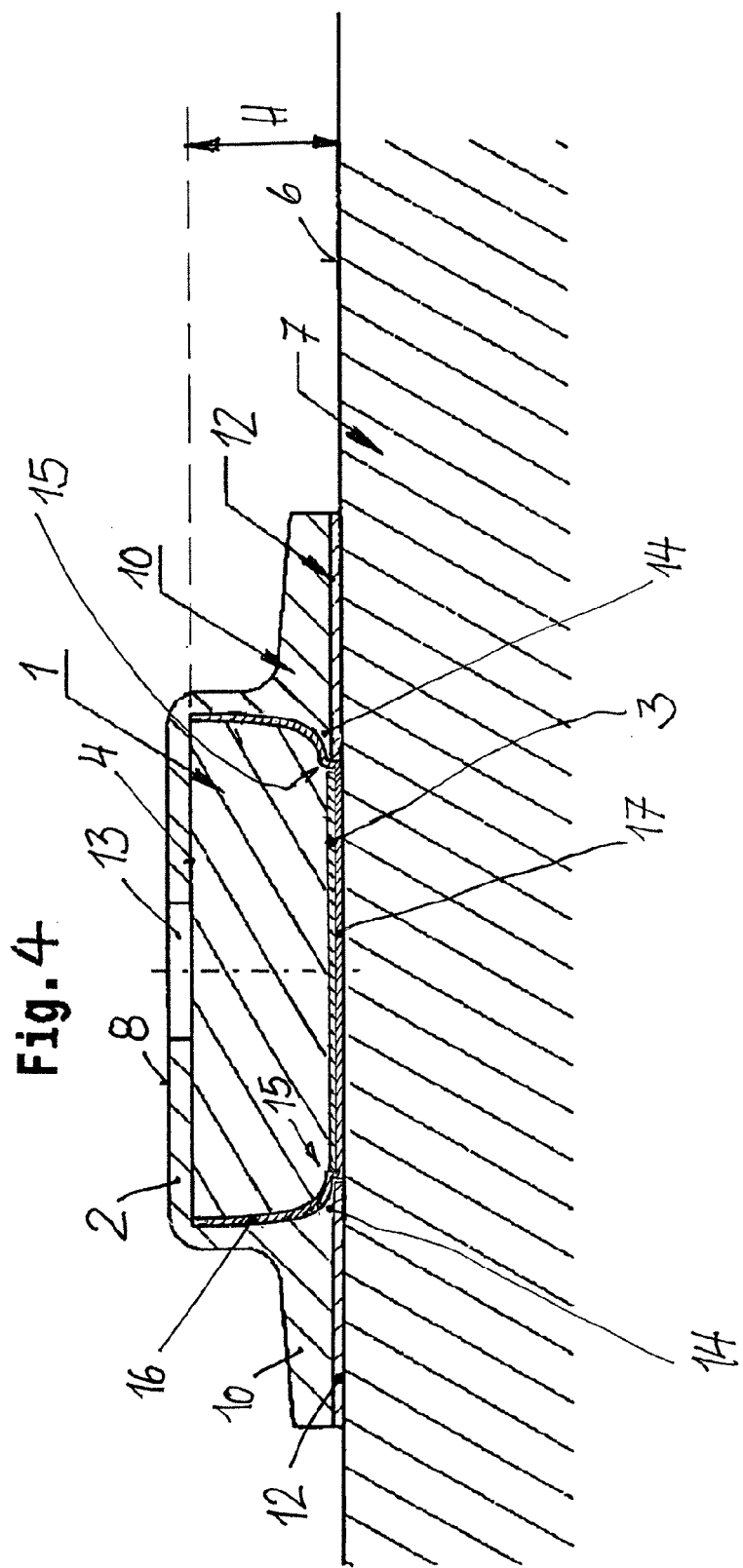

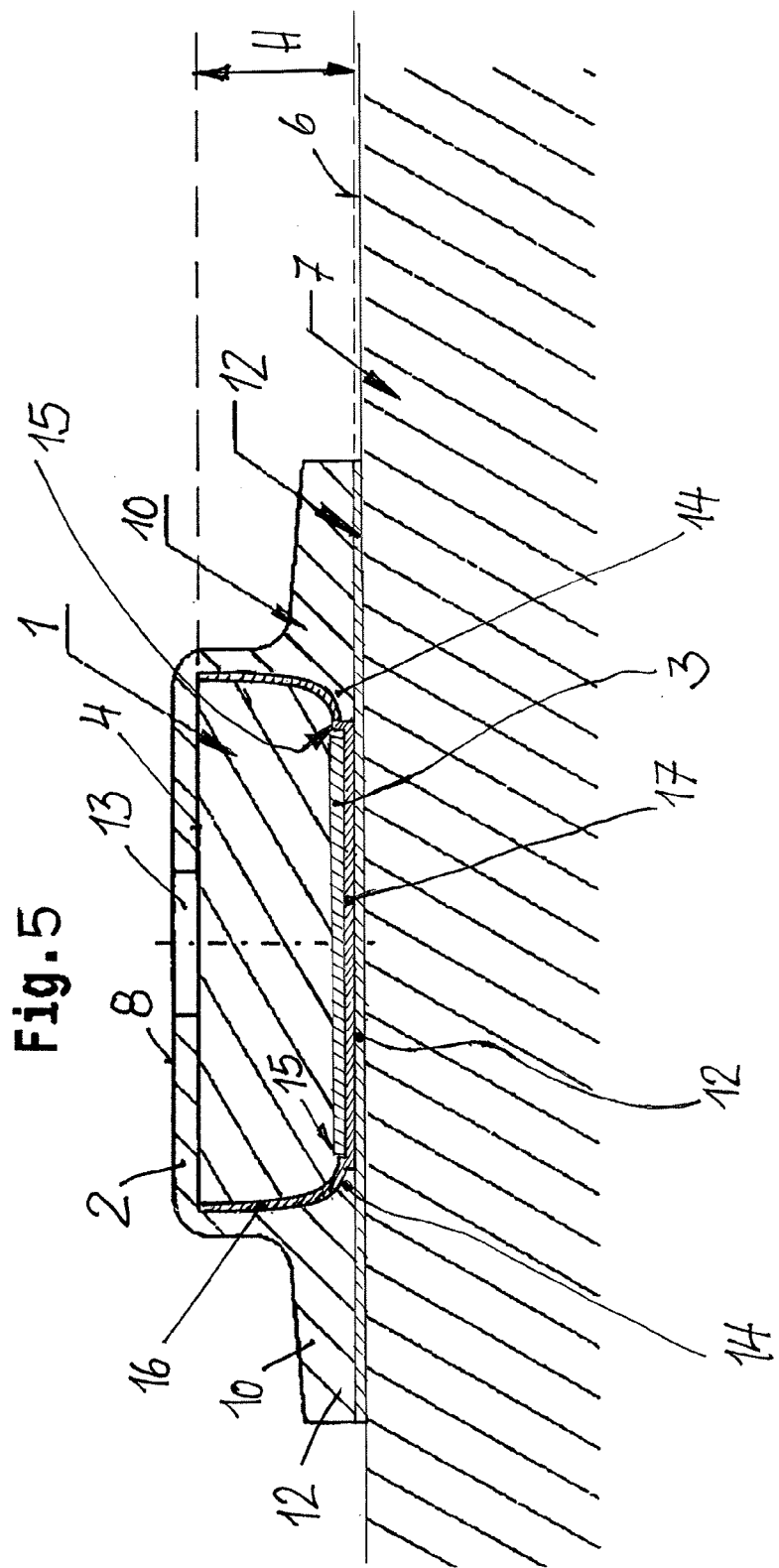

TIRE MODULE WITH PIEZOELECTRIC TRANSDUCER

CROSS-REFERENCE TO RELATED APPLICATIONS

This continuation application claims priority to PCT/EP2013/067089 filed on Aug. 15, 2013 which has published as WO 2014/027067 A1 and also the German application number 10 2012 107 573.5 filed on Aug. 17, 2012, and German application number 10 2012 110 589.8 filed on Nov. 6, 2012, the contents of which are fully incorporated herein with these references.

DESCRIPTION

Field of the Invention

The invention relates to an arrangement comprising a tire module for attachment to the inner side of a pneumatic tire for vehicles, and a cover which accommodates the tire module.

Background of the Invention

The arrangements disclosed in the prior art (DE 10 2010 038 136 A1 and DE 10 2008 035 498 A1) contain a tire module comprising a device for measuring and/or monitoring the air pressure in the tire, having a transmitter for transmitting radio signals which contain information on the air pressure in the tire, a mechanical-electrical transducer which converts changes in the shape of the transducer caused by the rolling tire into electrical energy, and has an accumulator for the electrical energy. In the known tire module, the mechanical-electrical transducer comprises a bendable piezoelectric element, which is located on a thin, flexible metal disk as the carrier. Document DE 10 2010 038 136 A1 discloses a capacitor as the accumulator for the electrical energy.

The tire module is completed by a casting compound, in which components of the tire module are entirely or partially embedded. The tire module is inserted in a cover, which is made of an elastomeric material and has a flange, which forms the edge of the interior space of the cover, extends outwardly away from the tire module and completely encloses an opening to the interior space of the cover. In the exemplary embodiment disclosed in DE 10 2010 038 136 A1, the cover and the tire module are substantially circular as viewed from above and the interior space of the cover is substantially circularly cylindrical. The outer dimensions of the tire module, which includes the casting compound, and the inner dimensions of the cover are matched to one another, wherein the tire module—as long as the cover is not mounted on the inner side of the tire—preferably protrudes slightly out of the cover in a downward direction such that the cover is under mechanical preload after said cover has been fastened via the flange thereof on the inner side of the tire. This results in a tight coupling of the mechanical-electrical transducer to the inner side of the tire.

The connection of the cover flange to the inner side of the tire can take place via adhesive bonding or vulcanization.

In the known tire module, the mechanical-electrical transducer along with the carrier thereof is disposed directly on the inner side of the tire such that deformations of the inner side of the tire are transmitted to the mechanical-electrical transducer, which converts the changes in shape occurring thereon into electrical energy, which is stored in the tire module for the operation of the measurement and transmission devices. These changes in shape are periodically transmitted to the mechanical-electrical transducer, when the tire is rolling, every time the tire module enters the shuffle thereof and re-emerges from the shuffle. The shuffle is that part of the tire that has momentary contact with the road.

Experience has shown that the efficiency of the known mechanical-electrical transducer can decrease as operating time increases. This is disadvantageous because the electrical energy available in the accumulator decreases as a result and the time intervals between measurement processes and between transmission processes become longer because the energy required for more frequent measurement and transmission processes is no longer available. This is disadvantageous, in turn, because continuous, automatic tire pressure monitoring is important for the safety of a vehicle and is that much better the more frequently the tire pressure monitoring can be carried out and the more frequently the result can be wirelessly transmitted.

The problem addressed by present invention is that of preventing or at least slowing a decrease in the efficiency of the mechanical-electrical transducer, as far as possible, in an arrangement of the initially mentioned type.

SUMMARY OF THE INVENTION

The problem of the prior art is solved by an arrangement having the features defined in the first independent claim. Another solution to the problem that is based on the same invention is defined in the second independent claim. A tire having an arrangement according to the invention fastened thereto is the subject of a dependent claim. Advantageous developments of the invention are the subject of the other dependent claims.

The arrangement according to the invention differs from the closest prior art in that the cover flange has an inwardly directed projection, which engages beneath the tire module, the underside of which lies, for this purpose, higher up in the region of the flange projection than it does in a central region of the underside of the tire module.

Due to this surprisingly simple arrangement, a decrease in the efficiency of the mechanical-electrical transducer is slowed or even prevented in the arrangement according to the invention.

The coupling of the mechanical-electrical transducer to the inner side of the tire is permanently stable. After the flange is connected to the inner side of the tire, which can be carried out by means of adhesive bonding or vulcanization, the tire module rests against the inner side of the tire. Preferably, the cover permanently presses the tire module against the inner side of the tire as a result of the mechanical preload prevailing in said cover. The inwardly directed flange projection, which extends somewhat between the underside of the tire module and the inner side of the tire, does not prevent this, because a region was created on the underside of the tire module in the region of the flange projection that is higher up than in a central region of the underside of the tire module. In this context it should be clarified that the terms "top side" and "underside" of the tire module are intended to mean that the underside of the tire module is the side with which said tire module comes to rest on the inner side of the tire. The top side is the side of the tire module facing away from the underside, which points toward the central axis of the tire after the tire module has been fastened on the inner side of the tire, in the region of the tread of the tire. The underside of the tire module is the side that faces the inner side of the tread of the tire. Correspondingly, the underside of the flange is the side of the flange that is intended to be connected to the inner side of the tire.

When the cover is connected to the inner side of the tire, the underside of the tire module rests on the inner side of the tire, as far as the inwardly directed projection of the flange does not extend between the underside of the tire module and the inner side of the tire, for the purpose of which the underside of the tire module lies higher up in the region of the flange projection, i.e., in the edge region of the underside of the tire module, than it does in the central region of the underside of the tire module. The connection of the cover flange to the inner side of the tire can take place via adhesive bonding or vulcanization.

Preferably the contour of the flange projection and the contour of the underside of the tire module are matched to one another in the region in which the inwardly directed flange projection is located such that, when the cover flange is connected to the inner side of the tire, a preload of the cover causes not only the central region of the underside of the tire module to be pressed against the inner side of the tire, but also the flange projection, since the tire module presses via an edge region of the underside thereof onto the projection.

The flange does not necessarily need to be fixedly connected to the inner side of the tire by means of adhesive bonding or vulcanization. Preferably, not only is the outwardly extending flange fixedly connected to the inner side of the tire, but so is the inwardly directed projection thereof, in the same manner. When an adhesive is used, the flange and the projection thereof are expediently precoated with the adhesive on the underside thereof. If the flange is supposed to be connected to the inner side of the tire by vulcanization, this can be carried out by providing a thin, flat rubber ring between the flange and the inner side of the tire, said ring being connected to the underside of the flange and the projection thereof on one side and, on the other side, to the inner side of the tire, in particular to the inner side of the tread of the tire. A rubber ring that is 0.3 mm to 1.3 mm, preferably 0.4 mm to 0.6 mm thick is particularly suitable.

Instead of such a flat rubber ring, it is particularly preferable to provide an all-over rubber disk, which is connected via vulcanization to the underside of the cover flange, including the inwardly directed projection thereof, on one side and, on the other side, to the inner side of the tire, in particular to the inner side of the tread of the tire. The rubber disk is expediently 0.3 mm to 1.3 mm, preferably 0.4 mm to 0.6 mm thick and preferably has the same diameter as the cover flange. Compared with the use of a rubber ring, the use of a rubber disk has the advantage that the attachment of the tire module to the tire is simplified and rubber waste is avoided.

The higher-up edge region of the underside of the tire module preferably extends around the entire periphery of the tire module. Correspondingly, the cover flange projection preferably extends around the entire inner periphery of the flange such that a connection of the cover to the inner side of the tire is obtained that is equally effective everywhere on the periphery of the tire module.

Particularly preferred are a tire module and a cover for the tire module, which have a substantially circular shape as viewed from above and comprise a substantially cylindrical or conical jacket of the tire module and the cover. The shape and dimensions of the tire module and the cover are preferably matched to one another such that the cover accommodates the tire module without play.

In order to ensure that, after being fastened to the inner side of the tire, the cover remains under mechanical preload and the tire module is pressed against the inner side of the tire for as long as possible, the cover should be made of a material that can be stretched and thereby develop a return force, but that does not creep or age, or does so as slowly as possible. The cover is therefore preferably made of an elastomeric material. When selecting said material, care should be taken to ensure that the material has a moderate degree of cross-linking. If the degree of cross-linking is too high, polymeric materials exhibit a duroplastic behavior instead of an elastomeric behavior. If the degree of cross-linking is too low, the elastomers can become too soft for purposes of the present invention. Suitable elastomers are natural caoutchouc and rubber made from natural caoutchouc, ethylene propylene diene monomer caoutchouc (EPDM), and butyl caoutchouc.

The flange projection preferably engages beneath the underside of the tire module in a form-fit manner. The form-fit connection is strengthened by the connection, according to the invention, of the arrangement comprising the tire module and the cover to the inner side of the tire.

The flange projection and the edge region on the underside of the tire module, which accommodates the projection, can have a stepped design. Such a geometry results in a particularly good form-fit connection. However, the flange projection is preferably designed such that the height thereof tapers continuously in a direction from the outside toward the inside to a minimum height, wherein the minimum height can be as small as is technically possible. Likewise, the outwardly extending flange can be stepped in the vertical section thereof, but it is also possible to provide the flange with such a shape that the wall thickness of the wall extending between the top side and the underside of the cover constantly increases from top to bottom across a selectable height difference such that the thickness of the flange constantly decreases in a direction from the inside to the outside. Such a design has the advantage that peaks in the distribution of forces in the elastomeric cover can be diminished or avoided.

Preferably, the tire module has a trough as an integral component, the base of which forms the underside of the tire module and the wall of which is shaped such that, after the tire module is attached to the inner side of the tire, some space is available between said inner side of the tire and the trough, which space accommodates the flange projection.

The trough accommodates the rest of the components of the tire module, including the casting compound. Said trough has a plurality of advantages: The trough can be used simultaneously as a mold for casting the tire module with the casting compound, the tire module has an exactly defined shape after casting, and a material can be selected for the trough that does not adhere to the inner side of the tire or—if the cover of the tire module was connected to the inner side of the tire with a rubber disk being joined therebetween by means of vulcanization—to the rubber disk, but rather can glide on the inner side of the tire or on the rubber disk during the changing deformations of the tire. The trough is preferably shaped from a plastic foil, e.g., by deep drawing or by warm working. The trough should have a base that is so thin that it easily deforms along with the deformation of the tire and transmits said deformation to the mechanical-electrical transducer, which is located in the trough, preferably directly on the base of the trough.

The mechanical-electrical transducer is preferably formed by a bendable piezoelectric element, which is applied onto a thin, metallic disk as a carrier. The thin, metallic disk should also be so thin that it easily matches the deformation of the tire such that electrical energy generated by means of the piezo effect can be stored in the accumulator of the tire module, which is required to operate the electrical components of the tire module, in particular to measure the pressure and to transmit signals, which contain information on the pressure. The accumulator can be a capacitor.

The solution to the problem defined in claim 2 differs from the problem defined in claim 1 merely in that the inner height of the cover is not less than, but rather is equal to the height of the tire module as measured from the underside thereof to the top side thereof. In this case as well, a reduction in the efficiency of the mechanical-electrical transducer is slowed or even prevented.

BRIEF DESCRIPTION OF THE DRAWINGS

The accompanying drawings illustrate the invention. In such drawings:

FIG. 1 shows a vertical section through an arrangement comprising a tire module and a cover, which is fastened to the inner side of a tire, according to the prior art;

FIG. 2 shows a vertical section corresponding to FIG. 1 through an arrangement according to the invention;

FIG. 3 shows an enlarged detail from FIG. 2;

FIG. 4 shows a modification of the arrangement from FIG. 2; and

FIG. 5 shows a second modification of the arrangement from FIG. 2, in an illustration according to FIG. 4.

DETAILED DESCRIPTION OF THE PREFERRED EMBODIMENTS

Parts that are identical or similar are labelled in the five figures with the same reference numerals.

FIG. 1 shows, enlarged and schematically, a known and substantially cylindrical tire module 1 in a cover 2, which accommodates the tire module 1 without play. The tire module 1 has a top side 4 and an underside 5, which rests in the installed state against the inner side 6 of the tread of a tire 7. The cover 2 has a top part 8, which rests on the top side 4 of the tire module 1, and a substantially cylindrical jacket 9, which encloses the tire module 1 and transitions into an outwardly extending flange 10, which has an underside 11, which faces the inner side 6 of the tread of the tire 7 and is adhesively bonded to the inner side 6 of the tire 7. The adhesive layer 12 is shown having a greatly exaggerated thickness.

The cover 2 is made of an elastomeric material. The inner height thereof, which is measured including the adhesive layer 12, is that much smaller than the height H of the tire module 1 that the flange 10 of the cover 2 can be adhesively bonded all-over to the inner side 6 of the tire 7 only when the inner height of the cover 2 is resiliently stretched such that the cover 2, after being fixedly connected to the inner side 6 of the tire 7, has a mechanical preload, by means of which the tire module 1 is pressed against the inner side 6 of the tire 7.

The fastening of the cover 2 to the tire 7 is independent of how the components of the tire module 1 are specifically designed and arranged. The arrangement of the components in the tire module 1 is therefore also not shown in detail. The mechanical-electrical transducer 3, which is intended to provide the electrical energy for operating the tire module 1, should rest against the inner side 6 of the tread of the tire 7 as tightly as possible, however, such that the deformations of the inner side 6 of the tire 7 are effectively transmitted to the mechanical-electrical transducer 3, in particular at the beginning and at the end of each passage through the shuffle, wherein the position of said mechanical-electrical transducer is illustrated merely schematically in FIG. 1. A casting compound fills open spaces between the rest of the components of the tire module 1 and largely determines the outer contour of the tire module 1.

The cover 2 has a central hole 13 on the top side 4, which allows the air that is under pressure in the tire 7 to access a pressure sensor in the tire module 1 such that the air pressure in the tire 7 can be measured.

The exemplary embodiment of the present invention illustrated in FIG. 2 differs from the prior art illustrated in FIG. 1 in that the flange 10 has an inwardly extending projection 14, the underside of which is aligned with the underside 11 of the outwardly extending flange 10. The projection 14 is substantially lower than the flange 10, however. The projection 14 has a stepped design and fits into a corresponding stepped recess 15 in the region of the lower edge of the tire module 1. In this manner, the cover 2—as viewed from below—is provided with an undercut formed by the projection 14 and, as viewed from above, the tire module 1 is provided with a corresponding undercut formed by the recess 15, wherein these two undercuts enter into a form-fit connection with one another. The projection 14 and the recess 15 extend around the entire periphery of the tire module 1.

Experiments have shown that the arrangement according to the invention, which comprises a tire module 1 and an elastomeric cover 2, which accommodates the tire module 1 and, after being fastened to the inner side 6 of a tire 7, is under mechanical preload and presses the tire module 1 and the projection 14 of the flange 10 against the inner side 6 of the tire 7, has a substantially better behavior than the prior art according to FIG. 1 in terms of the long-term stability of the efficiency of the mechanical-electrical transducer 3 disposed on or close to the underside 5 of the tire module 1. Raising the projection 14 does not result in a relevant improvement of the long-term stability. The cover 2 can be fastened to the inner side 6 of the tire 7 by connecting the flange 10 to the inner side 6 of the tire 7 by means of adhesive bonding or vulcanization. In the case of vulcanization, a thin, flat ring made of rubber is preferably present at the location of the adhesive layer 12.

The exemplary embodiment illustrated in FIG. 4 differs from the exemplary embodiment illustrated in FIG. 2 and FIG. 3 in that the tire module 1 has a trough 16, which accommodates all the other components of the tire module 1. The trough 16 can be formed from a plastic foil, e.g., a polycarbonate. The bottom 17 thereof is so thin that it easily deforms along with deformations of the tread of the tire 7, on the inner side 6 of which the bottom 17 of the trough 16 rests when the tire module 1 is fastened on the tire 7 such that deformations of the inner side 6 of the tire 7 are transferred to the mechanical-electrical transducer 3, which is the prerequisite for said mechanical-electrical transducer to generate electrical energy, which can be stored in the tire module 1 for the operation thereof. The trough 16 is not adhesively bonded to the inner side 6 of the tire 7. Instead, when the tire deforms, the bottom 17 of the trough 16 can glide on the inner side 6 of the tire 7, for the purpose of which it is favorable to select a material for the trough 16 that has the lowest possible coefficient of static friction and coefficient of sliding friction possible relative to the specified inner side 6 of the tire 7. Such a trough 16 can also be used in other embodiments of the tire module according to the invention, in particular also in the exemplary embodiment according to FIGS. 2 and 3.

The exemplary embodiment of FIG. 4 also differs from the exemplary embodiment in FIG. 2 in that the projection 14 of the flange 10 is not designed with a pronounced stepped shape, but rather has a thickness that decreases constantly to the inner end thereof. This helps to prevent pronounced peaks in the distribution of forces in the elastomeric cover 2.

The exemplary embodiment illustrated in FIG. 5 applies to the case in which the inner height of the cover 2 is less than the height of the tire module 1, as well as to the case in which it is equal to the height of the tire module 1. It differs from the exemplary embodiment illustrated in FIG. 4 in that, instead of the annular adhesive layer 12 or instead of the vulcanized, flat rubber ring 12, which connects the flange 10 to the inner side 6 of the tire 7, an all-over rubber disk 12 is present, which is connected via vulcanization to the inner side 6 of the tire 7 on one side and, on the other side, to the flange 10 of the cover 2. The rubber disk 12 is preferably 0.4 mm to 0.6 mm thick and has the same diameter as the flange 10. For vulcanization, the flange 10 is acted upon from above with pressure and heat. By means of the vulcanization, the rubber disk 12 bonds with the flange 10 and with the inner side 6 of the tire 7. The cross-linking of the rubber disk 12 with the inner side 6 of the tire 7 extends not only on the annular region beneath the flange 10, but also on the central region of the rubber disk 12. The rubber disk 12 does not bond with the bottom 17 of the trough 16, however, and therefore the bottom 17 can glide on the rubber disk 12 when the tire 7 deforms. In order to make this possible, it is favorable to use a material for the trough 16 that has the lowest possible coefficient of static friction and coefficient of sliding friction relative to the rubber disk 12. The use of a rubber disk 12 instead of a rubber ring simplifies the attachment of the tire module 1 to the tire 7 and prevents waste.

A rubber disk 12 can also be used in a modification of the example illustrated in FIG. 2, in which the trough 16 is omitted.

LIST OF REFERENCE CHARACTERS 1. tire module
2. cover
3. mechanical-electrical transducer
4. top side of the tire module
5. underside of the tire module
6. inner side of the tire
7 tire
8. top side of the cover
9. jacket
10. flange
11. underside of the flange
12. adhesive layer or rubber ring or rubber disk
13. central hole
14. projection
15. stepped recess
16. trough
17. bottom of the trough
H height of the tire module

What is claimed is:

1. An arrangement comprising a tire module for attachment to the inner side of a pneumatic tire for vehicles, and a cover, which accommodates the tire module,
    wherein the tire module comprises:
        a top side and an underside;
        a device for measuring and/or monitoring the air pressure in the tire;
        a transmitter for transmitting radio signals that contain information on the air pressure in the tire;
        a mechanical-electrical transducer, which converts changes in the shape of the transducer caused by the rolling tire into electrical energy; and
        an accumulator for the electrical energy; and
    wherein the cover comprises:
        a flange which extends outwardly away from the tire module and has an underside for attachment to the inner side of the tire, said flange forming the edge of the interior space of the cover, and the inner height of the cover is less than the height of the tire module measured from the underside to the top side thereof such that the tire module projects beyond the underside of the flange of the cover;
        wherein the flange has an inwardly directed projection which engages beneath the tire module, wherein the underside of the tire module lies higher up in the region of the inwardly directed projection of the flange than it does in a central region of the underside of the tire module.

2. The arrangement according to claim 1, wherein the projection and the higher-up region of the underside of the tire module extend around the entire inner periphery of the flange or around the entire periphery of the tire module, respectively.

3. The arrangement according to claim 1, wherein the projection engages beneath the tire module in a form-fit manner.

4. The arrangement according to claim 1, wherein the projection and the region of the tire module accommodating the projection have a stepped design.

5. The arrangement according to claim 1, wherein the projection tapers continuously in a direction from the outside toward the inside to a minimum height.

6. The arrangement according to claim 5, wherein the projection tapers continuously to a minimum height of zero.

7. The arrangement according to claim 1, wherein the cover is made of an elastomeric material.

8. The arrangement according to claim 1, wherein the tire module comprises a trough, as an integral component, which accommodates the rest of the components of the tire module, including a casting compound.

9. The arrangement according to claim 8, wherein the trough is formed from a plastic foil.

10. The arrangement according to claim 8, wherein the trough has a bottom that is so thin that it deforms along with the deformation of the tire and transmits said deformation to the mechanical-electrical transducer while said mechanical-electrical transducer passes the shuffle of the tire when said tire is rolling.

11. The arrangement according to claim 8, wherein the trough is formed by deep drawing a foil.

12. The arrangement according to claim 1, wherein the mechanical-electrical transducer comprises a bendable piezoelectric element.

13. A pneumatic tire for vehicles, on the inner side of which an arrangement according to claim 1 is fastened in that the flange of the cover is directly or indirectly connected to the inner side of the tire by adhesive bonding or by vulcanization.

14. The pneumatic tire according to claim 13, wherein the flange of the cover is fastened on the inner side of the tread of the tire.

15. The pneumatic tire according to claim 13, wherein a rubber disk is located between the cover and the inner side of the tire, which is connected via vulcanization to the flange on one side and, on the other side, to the inner side of the tire.

16. The pneumatic tire according to claim 15, wherein the diameter of the rubber disk is the same as the outer diameter of the flange.

17. The pneumatic tire according to claim 15, wherein the rubber disk is 0.3 mm to 1.3 mm thick.

18. The pneumatic tire according to claim 15, wherein the rubber disk is 0.4 mm to 0.6 mm thick.

19. The pneumatic tire according to claim 13, wherein also the inwardly directed projection of the flange is directly or indirectly connected to the inner side of the tire by adhesive bonding or by vulcanization.

20. The pneumatic tire according to claim 13, wherein the tire module presses onto the projection of the flange.

\* \* \* \* \*